United States Patent
Lee et al.

(10) Patent No.: US 8,512,773 B2
(45) Date of Patent: Aug. 20, 2013

(54) METHOD OF MAKING BREAD

(75) Inventors: Myoung Gu Lee, Seoul (KR); Byung Keon Son, Seongnam-si (KR); Jong Min Lee, Seongnam-si (KR)

(73) Assignee: Paris Croissant Co., Ltd., Songnam-Shi, Kyoungki-Do (KR)

( * ) Notice: Subject to any disclaimer, the term of this patent is extended or adjusted under 35 U.S.C. 154(b) by 216 days.

(21) Appl. No.: 12/418,504

(22) Filed: Apr. 3, 2009

(65) Prior Publication Data
US 2010/0255149 A1    Oct. 7, 2010

(51) Int. Cl.
*A21D 8/02*    (2006.01)

(52) U.S. Cl.
USPC .................. 426/19; 426/61; 426/62; 426/496

(58) Field of Classification Search
USPC ........................ 426/19, 61, 62, 496
See application file for complete search history.

(56) References Cited

U.S. PATENT DOCUMENTS

| | | | |
|---|---|---|---|
| 4,847,104 A * | 7/1989 | Benjamin et al. | 426/549 |
| 4,966,778 A | 10/1990 | Benjamin et al. | |
| 5,094,859 A | 3/1992 | Sluimer | |
| 5,171,590 A * | 12/1992 | Sluimer | 426/19 |
| 5,451,417 A * | 9/1995 | Freyn et al. | 426/551 |
| 5,560,946 A * | 10/1996 | Sanders et al. | 426/94 |

* cited by examiner

*Primary Examiner* — Lien T Tran
(74) *Attorney, Agent, or Firm* — patenttm.us

(57) ABSTRACT

A method of making bread is provided. The method includes a thermally treated dough making process of forming a thermally treated dough, a sponge making process of forming a sponge, a dough mixing process of mixing the thermally treated dough and the sponge with wheat flour, salt, butter, dried yeast, dried milk, sugar, egg, and water to form a dough mixture and stirring the dough mixture, a division process of dividing the dough mixture into equal-sized dough pieces, a first fermentation process of rolling out and fermenting the divided dough pieces for a predetermined period of time, a molding process of molding the dough pieces to fit a bread pan, a second fermentation process of fermenting the molded dough pieces in the bread pan, and a baking process of heating the fermented dough pieces.

2 Claims, 1 Drawing Sheet

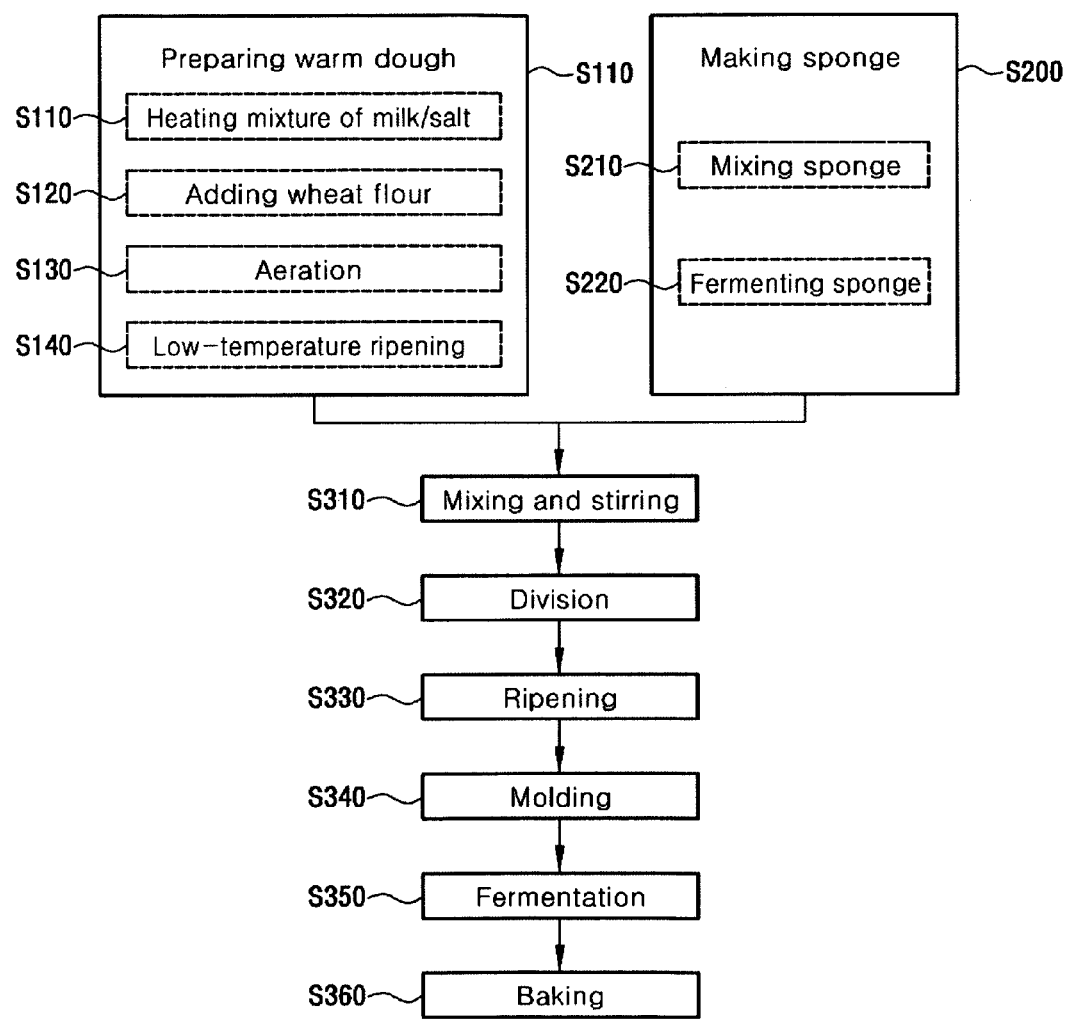

METHOD OF MAKING BREAD

BACKGROUND OF THE INVENTION

1. Field of the Invention

The present invention relates to bread and, more particularly, to a method of making bread using warm dough and sponge.

2. Description of Related Art

In general, white breads are box-shaped breads and may be classified into English breads made in the shape of a mountain peak by allowing the top thereof to rise, and American breads having a flat top made by baking dough placed in a bread pan with a closed cover.

The breads may also be classified into lean breads to which little sugar, milk or oil are added, and rich breads to which lots of sugar, milk and oil are added. The lean breads are used to make toast, and the rich breads are used to make sandwiches and are also called American breads.

A conventional method of making bread includes:
1. mixing a portion of raw ingredients to form a dough and fermenting the dough at 27° C. for 4 hours;
2. adding the remaining portion of raw ingredients to the fermented dough to be mixed;
3. leaving the resulting dough at room temperature for 20 minutes, dividing the resulting dough to fit a bread pan, and rolling out the divided dough;
4. leaving the rolled dough at room temperature for 20 to 30 minutes and molding the resulting dough to fit the bread pan;
5. placing the molded dough in the bread pan to be fermented at 30 to 40° C. for 50 to 60 minutes; and
6. baking the fermented dough.

However, the bread made by the conventional method has problems in that the activity and fermenting power of yeast deteriorate, which adversely affects the flavor, texture, and chewy taste, and speeds up the aging process through which aerated bread becomes hard and stiff.

SUMMARY OF THE INVENTION

The present invention is directed to a method of making bread that can improve the activity and fermenting power of yeast to improve the taste, flavor, and texture of bread.

The present invention is also directed to a method of making bread that can slow the aging process to increase shelf life and maintain good quality for a long time.

In one aspect, the present invention provides a method of making bread including: a warm dough making process in which a warm dough is formed by heating a mixture of milk and salt, adding wheat flour to the heated mixture, aerating the resulting mixture, and ripening the resulting mixture at low-temperature; a sponge making process in which a sponge is formed by mixing wheat flour, dried yeast, yeast food, bread improver, salt, and water and fermenting the mixture; a dough mixing process in which a dough is formed by mixing the warm dough and the sponge with wheat flour, salt, butter, dried yeast, dried milk, sugar, egg, and water, and stirring the mixture; a division process in which the dough is divided into equal-sized pieces; a ripening process in which the divided dough is rolled out and ripened at room temperature for a predetermined period of time; a molding process in which the resulting dough is molded to fit a bread pan; a fermentation process in which the molded dough is placed in the bread pan to be fermented; and a baking process in which the fermented dough is heated.

BRIEF DESCRIPTION OF THE DRAWINGS

The above and other objects, features and advantages of the present invention will be more apparent from the following detailed description taken in conjunction with the accompanying drawings, in which:

FIG. 1 is a flowchart illustrating a method of making bread in accordance with an exemplary embodiment of the present invention.

DETAILED DESCRIPTION OF THE INVENTION

Hereinafter, an exemplary embodiment of the present invention will be described in detail with reference to the accompanying drawings. In the following description, when it is deemed that describing certain well-known functions or components would detract from the clarity and concision of the description of the invention, the well-known functions or components will not be described.

FIG. 1 is a flowchart illustrating a method of making bread in accordance with an exemplary embodiment of the present invention. As shown in FIG. 1, a method of making brake in accordance with an exemplary embodiment of the present invention includes a warm dough making process (S100) as a first process, a sponge making process (S200) as a second process, and a dough mixing process (S310), a division process (S320), a ripening process (S330), a molding process (S340), a fermentation process (S350), and a baking process (S360) as a third process.

1. First Process

In the warm dough making process (S100), a warm dough is formed by heating a mixture of milk and salt, adding wheat flour to the heated mixture, aerating the resulting mixture, and ripening the mixture at low temperature. The warm dough making process (S100) is performed to aerate a portion of the warm dough to be aged at low temperature at which the aging process is speeded up and to mix the aerated dough with a dough, thus slowing the aging process. The warm dough making process (S100) uses the principle that when dough that has been aged once is to be aerated again, the aeration takes place at high temperature of about 120° C.

The warm dough making process (S100) includes a milk/salt heating step (S110) in which a mixture of milk and salt is heated to 95° C., a wheat flour addition step (S120) in which wheat flour is added to the heated mixture, an aeration step (S130) in which the resulting mixture is aerated and stirred, and a low-temperature ripening step (S140) in which the aerated mixture is ripened in a refrigerator at low temperature for more than 12 hours.

The milk/salt heating step (S110) includes a first heating step in which the mixture of milk and salt is heated at 60° C. for 30 minutes to increase the flavor of milk and a second heating step in which the resulting mixture is again heated to 95° C. It is preferable that the temperature of the warm dough after the aeration step (S130) be maintained at 60 to 65° C.

Although the mixing ratio of wheat flour, salt, and milk in the warm dough making process (S100) may vary according to embodiment, it is preferable that the mixing ratio of wheat flour, salt, and milk be maintained at 20:0.2:20.

2. Second Process

The sponge making process (S200) is performed to form a sponge by mixing wheat flour, dried yeast, yeast food, bread improver, salt, and water and fermenting the mixture. The sponge formed in the sponge making process (S200) is mixed with a dough together with the warm dough formed in the warm dough making process (S100) so as to slow the aging process and improve the activity and fermenting power of the yeast.

The sponge making process (S200) includes a sponge mixing step (S210) in which wheat flour, dried yeast, yeast food, bread improver, salt, and water are mixed and a sponge fermentation step (S220) in which the mixture is fermented at about 17° C. for about 12 hours.

3. Third Process

In the dough mixing process (S310), the warm dough and the sponge made in the above-described processes are mixed with wheat flour, salt, butter, dried yeast, dried milk, sugar, egg, and water to form a dough. It is preferable that the temperature of the dough after the dough mixing process (S310) be maintained at 27 to 28° C. In the dough mixing process (S310), the mixture is stirred at low and high speeds alternately, processed butter is added to the resulting mixture, and then the resulting mixture is stirred again at low and high speeds alternately. In the dough mixing process (S310) in accordance with the embodiment of the present invention, the warm dough and the sponge, which have been aged in the warm dough making process (S100) and the sponge making process (S200), are mixed with the dough formed in the dough mixing process (S310) so as to slow the aging process of the dough.

The division process (S320) is performed to divide the mixed dough into equal-sized pieces to fit a bread pan. A preliminary ripening period may be given just prior to the division process (S320).

In the ripening process (S330), the divided dough is rolled out and then ripened at room temperature for a predetermined period of time. It is preferable that the ripening process (S330) be performed for about 20 to 25 minutes.

The molding process (S340) is performed to mold the resulting dough to fit the bread pan. It is desired to deflate the dough before the molding process (S340).

In the fermentation process (S350), the molded dough is placed in the bread pan to be fermented. The fermentation process (S350) may be performed at a temperature of 35 to 38° C. and a relative humidity of 85 to 90% for 50 to 60 minutes.

The baking process (S360) is performed to heat the fermented and molded dough. It is preferable that the baking process (S360) be performed in an oven in which the temperatures of upper and lower heating elements can be controlled, respectively. The baking process (S360) may be performed with the upper heating element at 170° C. and the lower heating element for about at 210° C. 35 to 40 minutes.

Embodiment

A mixture of milk and salt was heated at 60° C. for 30 minutes and again heated to 95° C. Then, wheat flour was added to the heated mixture to be aerated and then stirred to form a warm dough. During stirring, the temperature was maintained at 60 to 65° C. Subsequently, the warm dough was ripened in a refrigerator at low temperature for more than 12 hours. At this time, the mixing ratio of wheat flour, salt, and milk was maintained at 20:0.2:20.

Separately from the warm dough, wheat flour, dried yeast, yeast food, bread improver, salt, and water were mixed at a mixing ratio of 70:0.6:0.03:0.5:0.2:46 and at a temperature of 18 to 19° C., and then fermented in a fermentation room at 17° C. for 12 hours, thus forming a sponge.

Then, the thus formed warm dough and sponge were mixed with a mixture of wheat flour, salt, butter, dried yeast, dried milk, sugar, egg, and water and stirred at a low speed of 30 rpm and at a high speed of 60 rpm alternately, thus forming a dough. At this time, the mixing ratio of wheat flour, salt, butter, dried yeast, dried milk, sugar, egg, and water was maintained at 10:2:9:0.2:3:8:5:14. The temperature of the dough was maintained at 27 to 28° C., and the resulting dough was left at room temperature for 20 to 30 minutes.

Next, the resulting dough was divided into equal-sized pieces, and the divided dough was rolled out, given a ripening time of 20 to 25 minutes at room temperature, molded, and then placed in a bread pan. Subsequently, the dough placed in the bread pan was fermented at a temperature of 37° C. and a relative humidity of 85 to 90% for 50 to 60 minutes. Then, the bread dough was placed in an oven and baked at 170° C. of the upper heating element and at 210° C. of the lower heating element for 35 minutes, thus making the bread.

As described above, according to the method of making bread of the present invention, since the once-aged warm dough and sponge are mixed with other dough, it is possible to improve the activity and fermenting power of yeast, thereby increasing the taste, flavor, and texture of bread and making soft bread.

Moreover, according to the method of making bread of the present invention, it is possible to slow the aging process to increase shelf life and maintain a good quality.

While exemplary embodiments of the present invention have been described and illustrated, it should be understood that various modifications to the described embodiments, which may be evident to those skilled in the art, can be made without departing from the spirit and scope of the present invention as defined by the appended claims.

What is claimed is:

1. A method of making bread, comprising:
    a thermally treated dough making process including a milk/salt heating step of forming a thermally treated dough by heating a mixture of 48% to 50% of milk and 1 to 2% of salt to 95° C., a wheat flour addition step of adding 48 to 50% of wheat flour to the heated mixture, an aeration step of aerating and stirring the mixture, and a low-temperature ripening step of ripening the aerated mixture at a refrigeration temperature for more than 12 hours;
    a sponge making process including a sponge mixing step of mixing wheat flour, dried yeast, yeast food, bread improver, salt, and water to form a mixture and a sponge fermentation step of fermenting the mixture at about 17° C. for 12 hours to form a sponge;
    a dough mixing process of mixing the thermally treated dough and the sponge with wheat flour, salt, butter, dried yeast, dried milk, sugar, egg, and water and stirring to form a dough mixture;
    a division process of dividing the dough mixture into equal-sized dough pieces;
    a ripening process in which the divided dough is rolled out and ripened for a predetermined period of time;
    a molding process of molding the dough pieces to fit a bread pan;
    a second fermentation process of secondarily fermenting the molded dough pieces in the bread pan; and
    a baking process of heating the fermented dough pieces.

2. The method according to claim 1, wherein said predetermined period of time is 20 to 25 minutes.

* * * * *